UNITED STATES PATENT OFFICE.

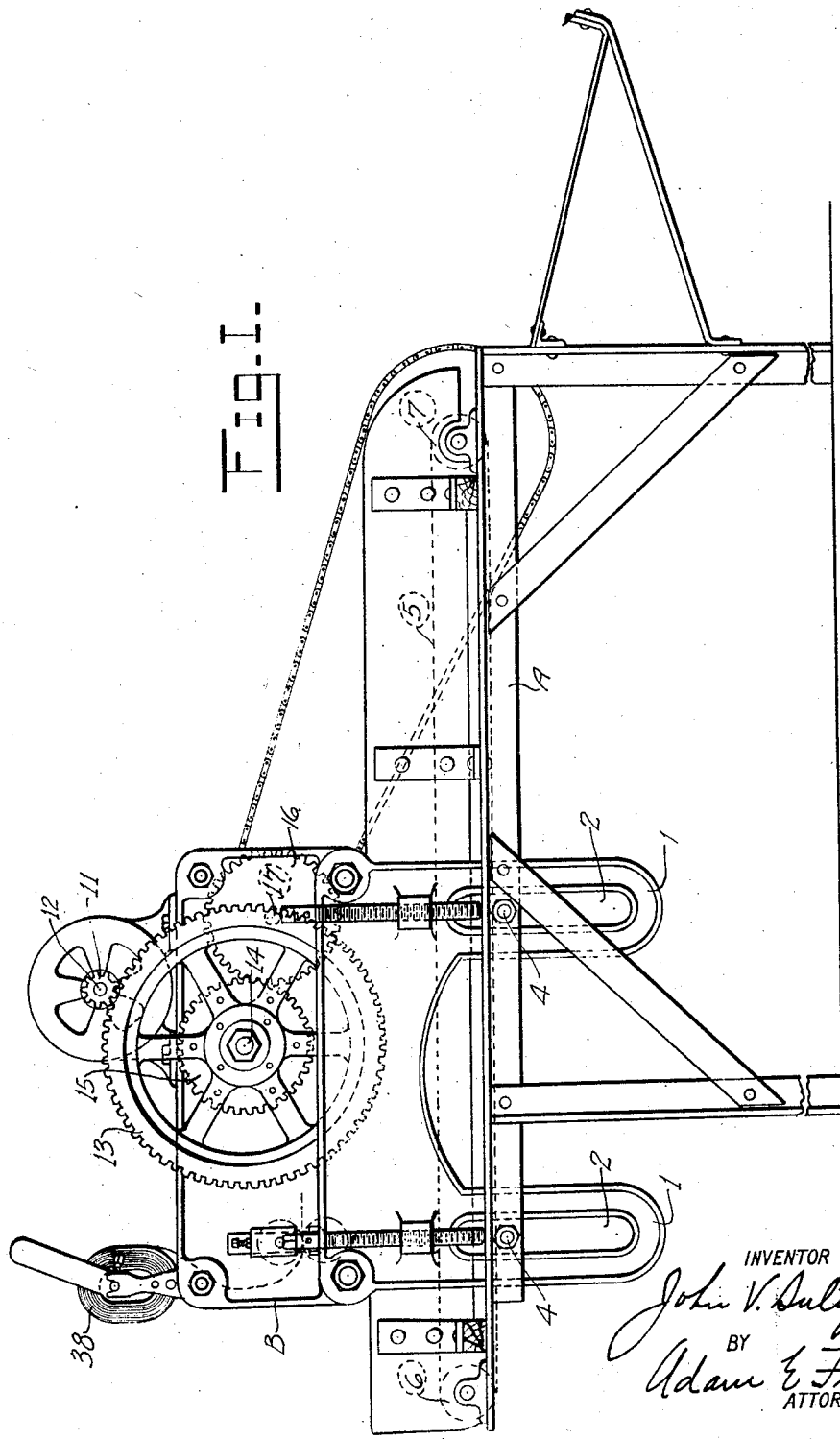

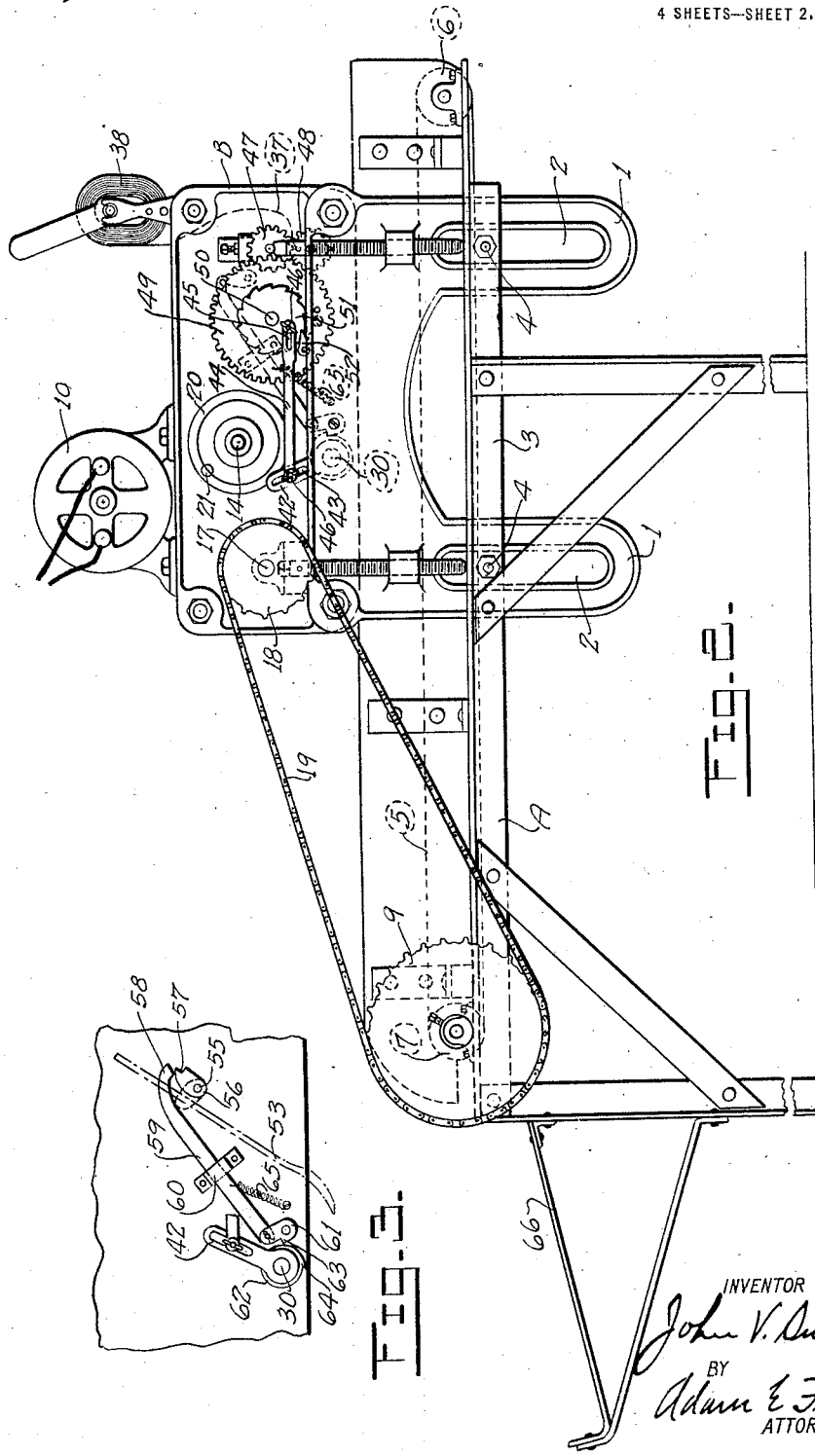

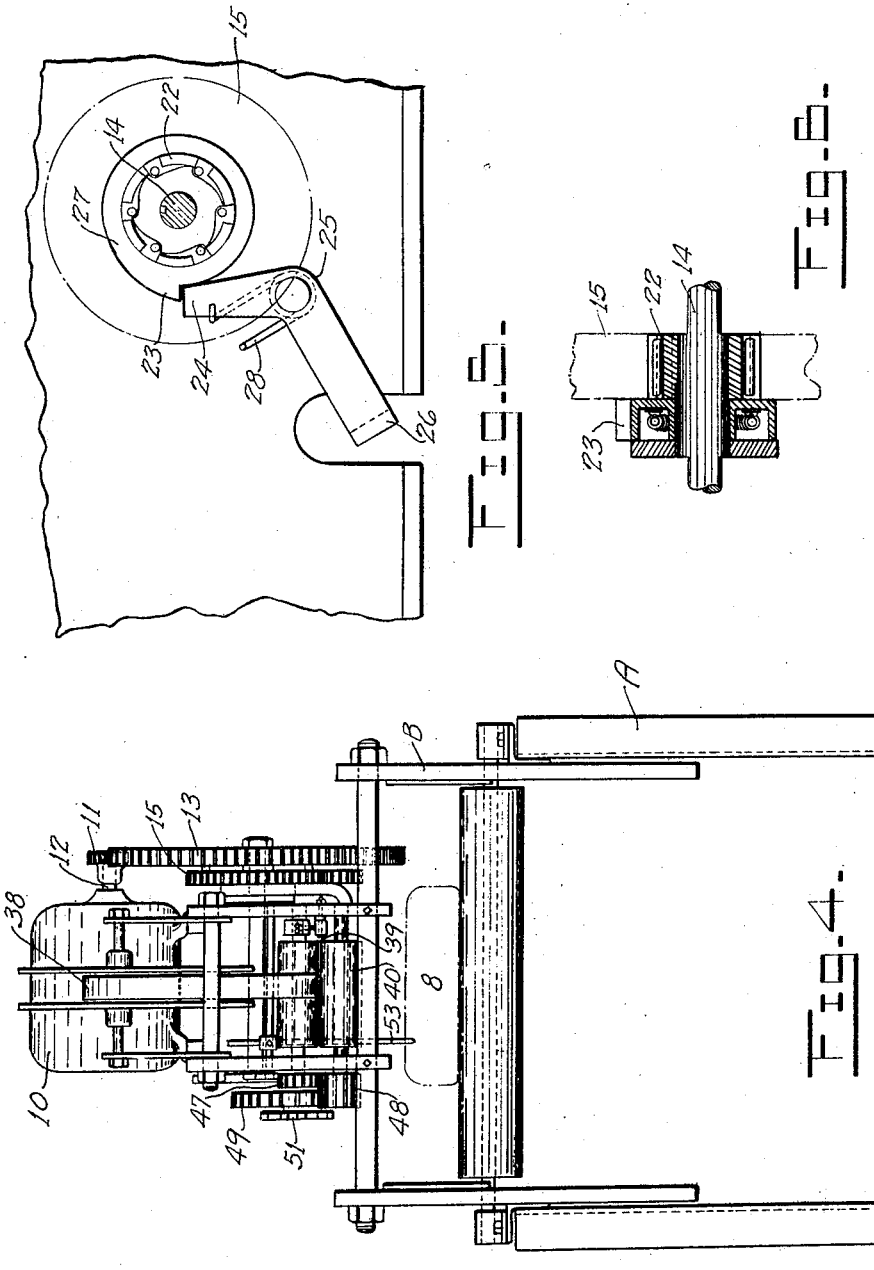

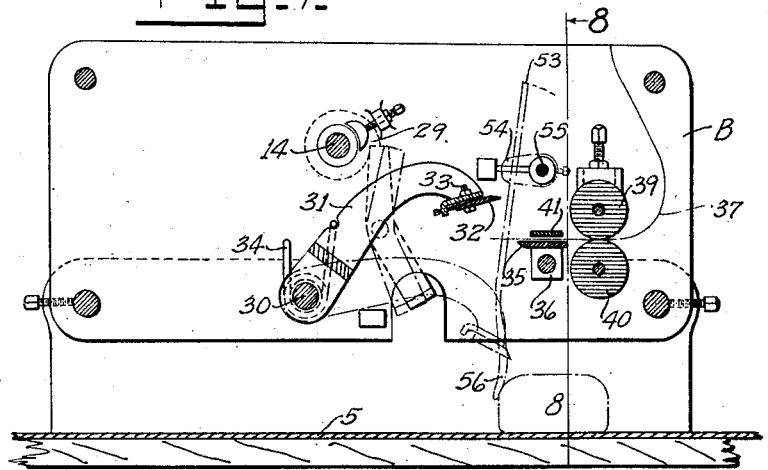
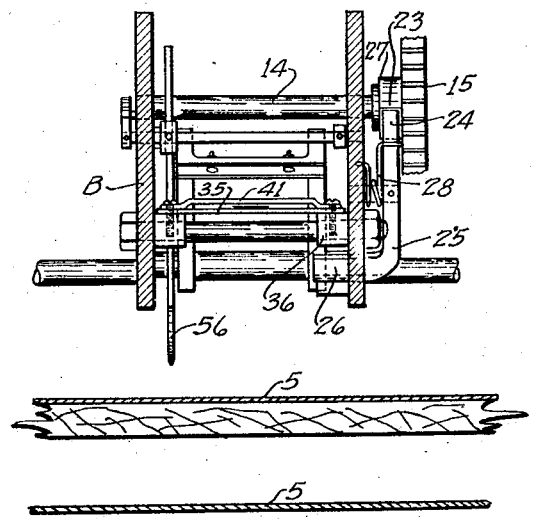

JOHN V. SULTZMAN, OF HANNIBAL, MISSOURI.

BREAD-LABELING MACHINE.

1,406,588. Specification of Letters Patent. Patented Feb. 14, 1922.

Application filed January 5, 1921. Serial No. 435,136.

*To all whom it may concern:*

Be it known that I, JOHN V. SULTZMAN, a citizen of the United States, residing in the city of Hannibal, county of Marion and State of Missouri, have invented new and useful Improvements in Bread-Labeling Machines, of which the following is a specification, reference being had to the accompanying drawings.

This invention pertains to bread labeling machines for use in bakeries, where it is desired to label the bread as it passes from the molds into the ovens.

The object is to provide an efficient and relatively simple automatic machine for this purpose.

In the drawings—

Fig. 1 is a right hand side elevation;
Fig. 2 is a left hand side elevation;
Fig. 3 is a detail of the trigger mechanism;
Fig. 4 is a frontal elevation;
Figs. 5 and 6 are details of the roller clutch mechanism;
Fig. 7 shows details of the label feeding and cutting mechanisms and the brake;
Fig. 8 is a transverse section on the line 8—8 in Fig. 7.

In carrying out the invention, a suitable supporting table A is provided, and upon this is mounted a secondary frame B. Vertical adjustment of the frame B is provided for by means of guides 1 depending from the frame B and which carry the elongated slots 2. These guides 1 pass inside the side rails 3, and bolts 4 are passed through the side rails and slots, and thus afford means for raising or lowering the frame B. A belt conveyor 5 is mounted along the table A over rollers 6 and 7, and serves for carrying the loaves of bread 8 through the machine and under the labelling mechanism. A sprocket 9 is mounted at the left hand end of the roller 7, and a motor 10 is located upon the frame B. A pinion gear 11 is mounted at the right hand end of the motor shaft 12, and meshes with the large drive gear 13 loosely mounted upon the right hand end of the main drive shaft 14, which is journaled across the frame B. A lesser gear 15 is fastened to the inner side of the gear 13, and meshes with a gear 16 on the shaft 17 journaled across the frame B. At the opposite or left hand end of the shaft 17 is mounted a sprocket 18, and a sprocket chain 19 connects the sprockets 18 and 9; and thus the conveyor 5 is driven.

The gears 13 and 15 normally revolve loosely upon the shaft 14, but a roller clutch mechanism 22 set into the hub of the gear 15 provides means for intermittently or periodically transmitting motion from the gear 15 to the shaft 14, as will be explained. The collar 27 is part of the clutch mechanism, and carries the shoulder or cam 23, adapted to engage the finger 24 of the bell crank stop lever 25. The lower end of this lever is bent in at a right angle to form the lug or foot 26. The finger 24 of this stop lever is spring pressed against the collar 27 by the spring 28. A spring pressed and adjustable brake 29 controls and steadies the rotation of the shaft 14. Thus the gears 13 and 15 normally rotate freely on the shaft 14, even while the shaft is stationary, but upon the stop lever 25 being operated, and the finger 24 withdrawn from the cam 23, then the clutch 22 operates to grip and rotate the shaft 14 one revolution, until the cam 23 comes around again into contact with the finger 24. When this occurs the clutch 22 is released again, and the shaft 14 again becomes stationary. At the left hand end of the drive shaft 14 is rigidly mounted a disk 20, and near the periphery of this disk, a resetting pin 21.

Below the main shaft 14 is journaled the cutter arm shaft 30, and at a medial point thereupon is rigidly mounted the cutter arm 31, same extending upwardly and forwardly and carrying at its end the label cutting shear 32. The shear 32 is adjustably mounted upon the arm 31 by means of bolts 33. The downward or cutting stroke of the shear 32 is accelerated by the spring 34. A stationary, shear 35, complementary to the cutting shear 32, is mounted on the cross bar 36, and the shear 32 is so nicely adjusted thereto, as to neatly cut the strip of labels 37 as same pass back over the shear 35. The strip of labels is carried on a roll 38, whence it passes down and between the rollers 39 and 40, and out between the shear 35 and the upper guard 41. The guard 41 is positioned immediately above the shear 35 and spaced therefrom just enough to allow the strip of labels to pass freely. Thus on every downward stroke of the arm 31, the shears 32 and 35 are adapted to cut off a label from the strip 37. The arm 31 is positioned above the foot 26 of the lever 25, the finger 24 of which controls the clutch 22 as aforesaid, and the arm 31 is thus adapted to trip the lever 25 and release the clutch 22 on every downward movement.

At the left hand ends of the rollers 39 and 40 are intermeshing gears 47 and 48, the lower gear 48 being extended so as to engage also the intermeshing gear 49 which is journaled upon a stub shaft 50 at the left hand side of the frame. Upon this same stub shaft 50 is loosely mounted a lesser ratchet wheel 51, and a spring set pawl 52 is mounted upon the gear 49 and disposed forwardly to engage the ratchet 51. At the outer end of the shaft 30 is rigidly joined a slotted crank bar 42, within the slot 43 of which is adjustably and pivotally mounted by means of a set screw 46, the rear end of a horizontal lever 44, the forward end of which carries a slot 45. By means of another set screw 46, passed through the slot 45 and into the ratchet 51, the forward end of the lever 44 is adjustably and pivotally secured to said ratchet. The resetting pin 21 is adapted to impinge the crank bar 42 as the disk 20 rotates, thus throwing the bar back, and resetting the apparatus after each label is cut.

A trigger 53 is mounted through a weighted lug 54, which in turn is rigidly attached to a shaft 55 journaled across the frame; and the lower end 56 of said trigger is disposed downwardly in the path of the loaves of bread 8 as same pass into the machine on the conveyor 5. A notched cam 56 is mounted on the shaft 55 to the left of the trigger 53, and the notch 57 of this cam is adapted to engage the upper curved end 58 of the release lever 59 which is slidingly held in position by the loop 60. The lower end of this lever is pivoted to a notched pawl 61 which is pivoted in turn adjacent a shouldered cam 62 mounted on the shaft 30. The notch 63 of the pawl 61 is adapted to engage the shoulder 64 of the cam 62 to hold the crank bar 42 and other elements in set position. A spring 65 serves to normally draw the lever 59 towards its lowermost position.

In operation, the loaves 8 are fed in their raw or dough form, from the molds into the machine. Carried along on the conveyor 5, they successively strike the trigger 53. The trigger moving back turns the shaft 55, raises the cam 56, releases the lever 59, thus allowing the notch 63 of the pawl 61 to fall clear of the shoulder 64 of the cam 62, and allowing the cutter arm 31 to fall, thus cutting off one of the labels 37, and carrying same down and pasting it on the loaf of bread beneath. The descent of the cutter arm moves the crank bar 42 and lever 44 forwardly, and turns the ratchet 51 sufficiently, so that upon the resetting of the apparatus and the retrograde motion of said ratchet and lever, the gears 49, 48 and 47, and the rollers 39, 40, will rotate just enough to draw another label out into place between the guard 41 and shear 35. The degree of rotation of the controlling gear 49 is regulated by adjusting the lever 44 relative to the crank bar 42, as provided for.

As the cutter arm 31 falls, it strikes the foot 26, thus releasing the finger 24 and setting the clutch 22 and causing the shaft 14 to rotate one turn;—that is, until the resetting pin 21 comes around forwardly and strikes the forward edge of the crank bar 42, whereupon said bar is carried back by the pin, the pawl 61 again engages the cam 62, the finger 24 again engages the shoulder 23 of the clutch and releases said clutch from the shaft 14, thus resetting the apparatus for another loaf. At the same time another label is drawn out and projected across the shear 35 as stated, ready for cutting and pasting upon the succeeding loaf. The loaves are labeled, pass through the machine and are discharged upon the receiver 66, whence they are passed into an oven and baked. The weighted lug 54 serves to carry the trigger again forwardly into position after each loaf passes. Any ordinary motor 10 may be employed to furnish the required power. A working model has demonstrated the efficiency of this machine.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. A machine for labeling raw bread loaves including a conveyor extending longitudinally of the machine and arranged to receive and carry the raw loaves through the machine, means for supporting a roll of labels above the said conveyor, a stationary shear blade also located above the conveyer, and spaced therefrom to permit the loaves to pass beneath it, means for intermittently feeding the labels to the stationary shear blade, a movable shear blade arranged to coact with the stationary shear blade to sever the labels and carry the severed labels to the loaves, means for actuating the movable shear blade and for setting the same means located above the conveyor for limiting the movement of the said movable blade to prevent the same from moving into the path of the loaves and means operated by the loaves for tripping the shear blade.

2. A machine for labeling raw bread loaves including a conveyor extending longitudinally of the machine and arranged to receive and carry the raw loaves through the machine, means for supporting the roll of labels above the conveyor, a stationary shear blade located above the loaves carried by the conveyor, means for feeding the labels to the stationary shear blade, a movable shear blade arranged to coact with the stationary shear blade to cut the labels and deposit the same upon the loaves, means for actuating the movable shear blade, means operable by the loaves for tripping the movable shear blade and means operable by the shear blade for resetting the same.

3. A machine for labeling raw bread loaves including a frame, a rotor, a power shaft adapted to connect the rotor and shaft and normally disengaged therefrom, an independent cutter arm shaft below the power shaft, an endless belt conveyor operable from the power shaft for carrying the loaves through the machine, a stationary shear blade above the train of loaves, means supporting a roll of labels in strip form adjacent the blade, gear controlled rollers for feeding the labels over the blade, an adjustable lever mechanism between the cutter arm shaft and the gear controlled rollers for synchronously operating the latter, a movable cutter arm extended from the cutter arm shaft, a shear blade at the free end of the cutter arm adapted to coact with the stationary blade for cutting the labels and depositing them on the loaves, a resetting lever extended from the clutch and controlled by the cutter arm to reset the apparatus by connecting the rotor and drive shaft each time the cutter arm falls, and a trigger and release lever and pawl mechanism operable by the entering loaves to set the machine in motion.

4. A machine for labeling raw bread loaves including a supporting frame, a rotor, a clutch and connected drive shaft, the latter adapted normally to stand at rest, a longitudinal conveyor arranged to receive and support the loaves for carrying the same through the machine, means for supporting a roll of labels in strip form above the loaves, an automatic label feeding mechanism for projecting the labels over the loaves, an automatic shearing mechanism for cutting the labels and depositing the same on the loaves, an automatic trigger mechanism operable by the loaves for operating the shearing and feed mechanisms, and an automatic resetting mechanism connected with a shearing and clutch mechanism and controlled by the former to reset the apparatus at each operation of the said shearing mechanism.

5. A machine for labeling raw loaves including a supporting frame, a rotor, a clutch and connected drive shaft, the latter adapted normally to stand at rest and release from the clutch an endless belt conveyor arranged to receive and carry the loaves of bread through the machine, means for supporting a roll of labels in strip form above the loaves, coordinated interdependent automatic label feeding, label cutting, trigger and resetting mechanism, the resetting mechanism being connected with the shearing and clutch mechanism and actuated by the former to reset the apparatus as each label is cut, the trigger mechanism being operated by the entering loaves to set the apparatus in motion.

6. A machine for labeling raw loaves including in combination a supporting frame, a rotor, a drive shaft, normally released clutch mechanism connecting the rotor and the drive shaft, an endless belt conveyor arranged to receive and carry the loaves through the machine, means for supporting a roll of labels in strip form above the loaves and automatic label feeding mechanism, an automatic shearing and depositing mechanism, trigger mechanism for operating the shearing mechanism and operable by each successive entering loaf, and an automatic resetting mechanism controlled by the shearing mechanism.

7. In a machine for labeling raw bread loaves as same pass into the machine, and wherein the labels are supplied in strip form, and a shearing mechanism depending from a cutter arm shaft is employed to cut and deposit them on the loaves; a trigger mechanism to actuate the shearing mechanism, same embodying a weighted trigger bar pivoted to hang in the path of the loaves; a notched cam at the upper end of the trigger bar; a lever slidingly mounted and having its upper end curved to engage the notch of the cam; a notched pawl pivoted at the lower end of said lever; and a shouldered cam on the cutter arm shaft adapted to releasably engage said notched pawl.

8. In a machine for labeling raw bread loaves, wherein labels are supplied in strip form and a shearing mechanism, depending from a cutter arm shaft, is employed to cut and deposit the labels; a label feeding mechanism, embodying a crank bar rigid at the end of the cutter bar shaft; gear operated rollers to feed the label strip to the shearing mechanism; and an adjustable lever, ratchet and pawl mechanism connecting said crank bar with said gear operated rollers and adapted to partially rotate the rollers to so feed the label strip each time the shearing mechanism operates.

9. In a machine for labeling raw bread loaves, having a clutch controlled drive shaft, a shearing mechanism with a cutter bar shaft and cutter arm, and a label feeding mechanism employing a rigid crank bar at the end of the cutter bar shaft; and a trigger mechanism operable by the loaves; a resetting mechanism to reset the apparatus after each label is cut, same embodying a resetting pin mounted eccentrically at one end of the drive shaft and adapted on rotation of the drive shaft to impinge and move the crank bar back for resetting the trigger mechanism; and a pivoted trip lever having its upper end controlling the clutch of the drive shaft to release the shaft at each revolution, and its lower end disposed below the cutter arm and adapted to be tripped thereby for resetting the clutch at each descent of the arm.

10. A machine for labeling raw bread loaves including a conveyor arranged to receive and carry the loaves through the machine, a motor, gearing for connecting the motor with the conveyor for continuously operating the latter, means for feeding a strip of labels adjacent the loaves, cutting mechanism including a movable cutter member arranged to sever a label and apply the same to a loaf, means controlled by the loaves for operating the cutter member in its cutting action and means for resetting the cutting member including a clutch for connecting the setting mechanism with the said gearing and a lever or member arranged in the path of the said cutter member and actuated by the same to operate the clutch.

11. A machine for labeling raw bread loaves including a conveyor arranged to carry the loaves through the machine, a motor, gearing for connecting the motor with the conveyor for continuously actuating the latter, means for feeding a strip of labels adjacent the loaves, cutting mechanism including a swinging cutter arm arranged to sever a label and apply the same to a loaf, means for setting the cutting arm, means controlled by the loaves for operating the cutter arm and means for resetting the cutter arm including a lever arranged in the path and actuated by the said cutter arm.

12. A machine for labeling raw bread loaves including a conveyor arranged to carry the loaves through the machine, a motor, gearing for connecting the motor with the conveyor for continuously actuating the latter, means for feeding a strip of labels adjacent the loaves, cutting mechanism including a swinging cutter arm arranged to sever a label and apply the same to a loaf, means for setting the cutting arm, means controlled by the loaves for operating the cutter arm, means for resetting the cutter arm including a clutch for connecting the resetting mechanism with the said gearing and a lever arranged in the path of the cutter arm and actuated by the same to operate the clutch.

JOHN V. SULTZMAN.

Witnesses:
 CHARLES E. RENDLEN,
 ANNA LENNON.